United States Patent
Bao

(10) Patent No.: US 9,587,671 B2
(45) Date of Patent: Mar. 7, 2017

(54) ROTATING MECHANISM OF A WORKING LAMP

(71) Applicant: Jack Sealey Ltd., Suffolk (GB)

(72) Inventor: Yong Bao, Yuyao (CN)

(73) Assignee: Yuyao Yuchang Electrical Appliance Co., Ltd., Yuyao (CN)

( * ) Notice: Subject to any disclaimer, the term of this patent is extended or adjusted under 35 U.S.C. 154(b) by 601 days.

(21) Appl. No.: 14/126,213

(22) PCT Filed: Oct. 8, 2012

(86) PCT No.: PCT/CN2012/001348
§ 371 (c)(1),
(2) Date: Dec. 13, 2013

(87) PCT Pub. No.: WO2014/043832
PCT Pub. Date: Mar. 27, 2014

(65) Prior Publication Data
US 2014/0321904 A1    Oct. 30, 2014

(30) Foreign Application Priority Data

Sep. 24, 2012 (CN) .......................... 2012 1 0355995

(51) Int. Cl.
*F21V 21/14* (2006.01)
*F16C 11/06* (2006.01)
(Continued)

(52) U.S. Cl.
CPC ............. *F16C 11/06* (2013.01); *F16M 11/14* (2013.01); *F16M 13/00* (2013.01); *F21L 4/04* (2013.01);
(Continued)

(58) Field of Classification Search
None
See application file for complete search history.

(56) References Cited

U.S. PATENT DOCUMENTS 4,533,982 A * 8/1985 Kozar ................. F21L 4/04
                                                362/183
5,485,357 A * 1/1996 Zolninger ............ A61F 4/00
                                                362/103
(Continued)

FOREIGN PATENT DOCUMENTS

| CN | 2482628 Y | 3/2002 |
|---|---|---|
| CN | 201053584 Y | 4/2008 |
| CN | 201666465 | 12/2010 |

*Primary Examiner* — Elizabeth A Quast
(74) *Attorney, Agent, or Firm* — Wang Law Firm, Inc.

(57) ABSTRACT

A rotating mechanism, for a working lamp with a housing and a base, including a connecting column, a ball joint, and a seat; wherein a second end of the connecting column extends inside the housing; the ball joint is rotatably mounted inside the seat and a elastic member pushes the ball joint against the seat; furthermore, the connecting column relative to the housing, or the seat relative to the base, can move along the axis of the housing. A certain space may be formed between the ball joint and the seat, thereby ensuring that the ball joint performs stepless rotation of 360 degrees as required and then drives the housing on the connecting column (or seat) and the illuminant in the housing to rotate, subsequently realizing universal illumination conveniently. In the invention, light can be universally adjusted to a required angle and the purpose of reliable positioning can be realized.

10 Claims, 11 Drawing Sheets

(51) Int. Cl.
  *F21V 21/088* (2006.01)
  *F21V 21/40* (2006.01)
  *F21V 21/29* (2006.01)
  *F16M 11/14* (2006.01)
  *F21L 4/04* (2006.01)
  *F21L 14/02* (2006.01)
  *F21V 21/06* (2006.01)
  *F21V 21/08* (2006.01)
  *F21V 21/096* (2006.01)
  *F16M 13/00* (2006.01)
  *F21Y 101/00* (2016.01)

(52) U.S. Cl.
  CPC ............ *F21L 14/026* (2013.01); *F21V 21/06* (2013.01); *F21V 21/08* (2013.01); *F21V 21/0885* (2013.01); *F21V 21/0965* (2013.01); *F21V 21/145* (2013.01); *F21V 21/29* (2013.01); *F21V 21/406* (2013.01); *F21Y 2101/00* (2013.01); *F21Y 2103/10* (2016.08); *F21Y 2115/10* (2016.08); *Y10T 403/32713* (2015.01)

(56) References Cited

U.S. PATENT DOCUMENTS

| | | | | |
|---|---|---|---|---|
| 6,986,590 | B1* | 1/2006 | Padden | A44B 15/005 362/116 |
| 7,896,520 | B1* | 3/2011 | Norling | A47J 37/0786 362/191 |
| 8,746,918 | B1* | 6/2014 | Rubino | F21L 4/04 359/221.2 |
| 9,303,832 | B2* | 4/2016 | Sun | F21L 4/04 |
| 2005/0201085 | A1* | 9/2005 | Aikawa | F21L 4/045 362/198 |
| 2005/0207148 | A1* | 9/2005 | Maglica | F21L 4/005 362/197 |
| 2010/0232869 | A1* | 9/2010 | Ditzler | E02F 9/006 403/122 |
| 2011/0036960 | A1* | 2/2011 | Li | F16C 11/106 248/288.31 |
| 2012/0294004 | A1* | 11/2012 | Stathis | F21V 21/26 362/249.1 |
| 2014/0029278 | A1* | 1/2014 | Burton | B60Q 1/068 362/487 |
| 2014/0321904 | A1* | 10/2014 | Bao | F16M 13/00 403/132 |
| 2015/0016866 | A1* | 1/2015 | Wainscott | F16C 11/0623 403/76 |

* cited by examiner

ROTATING MECHANISM OF A WORKING LAMP

RELATE APPLICATIONS

This application is a national phase entrance of and claims benefit to PCT Application for a Rotating Mechanism of a Working Lamp, PCT/CN2011/001137, filed on Oct. 8, 2012, which claims benefit to Chinese Patent Application 201210355995.4, filed on Sep. 24, 2012. The specifications of both applications are incorporated here by this reference.

FIELD OF THE INVENTION

The present invention relates to a working lamp, particularly to a rotating mechanism of a working lamp.

DESCRIPTION OF THE PRIOR ART

At present, there are various styles of working lamps, but the most common working lamp is the electric torch type including a cylinder and an illuminant. In general, a side wall of the front portion of the cylinder is designed to be transparent, so that light emitted by the illuminant irradiates out through the transparent side wall. Furthermore, in order to adjust the irradiation direction of light conveniently at any time, the cylinder of the working lamp is designed into two parts, i.e., a housing and a base, with a rotating mechanism provided between the housing and the base. The rotating mechanism mostly has a shaft hole and a main shaft matched with each other. The main shaft is inserted into the shaft hole so that the housing can rotate relative to the base. Furthermore, the rotating mechanism is further composed of a positioning member capable of positioning the housing at a certain angle during the rotation of the housing relative to the base. A Chinese patent CN201666465U (Patent No. ZL201020129086.5), titled "Rotating Mechanism of Electric Torch", disclosed such an electric torch. The electric torch is realized in such a way that a raised column (equivalent to the main shaft) on the base is rotatably provided through the shaft hole at the lower portion of the housing to form a hinge structure, and the positioning member is a pressure head, of a elastic sheet, clamped into a shallow slot at the lower portion of the housing. Although such working lamp is convenient to use to a certain extent, the irradiation angle is somewhat limited as the housing can rotate within a certain angle in a longitudinal plane only. Therefore, the illumination effect of such electric torch is influenced.

In addition to rotating in a longitudinal plane relative to the base, the housing may also rotate around its own axis via positioning members, for example, as described in a Chinese patent CN201053584Y (Patent No. ZL200720109869.5), titled "Working Lamp". The working lamp is realized by the fitting between an open clasp, the inner surface of which is polygonal, and a necking portion on a battery case. Although with an irradiation angle superior to that of the former, the working lamp has complex structure, and the direction adjustment may be realized only by a plurality of times of operations, so the adjustment is inconvenient.

In particular, adjustment on the angle of light, realized by the fitting between the shaft hole and the pin as well as by the fitting between the clasp and the necking portion, is a kind of step adjustment that is unable to achieve a real sense of adjustment at any angle.

Although, at present, there are lamps and lanterns employing a structure of adjusting the angle of light by a spherical hinge, for example, as described in a Chinese patent CN2482628Y (Patent No. ZL01241527.8), titled "Universal Illuminating Lamp". The lamp body of the illuminating lamp is hinged onto a connecting base via a spherical hinge connecting shaft. However, the spherical hinge connecting shaft is not applicable to an electric torch type working lamp. Even if applicable, there will be a gap between the connecting base and the spherical hinge connecting shaft because of multiple times of pivoting friction, further the spherical hinge connecting shaft cannot be positioned at a required angle, Therefore, for such illumination lamps and lanterns, adjustment and positioning of an angle will be influenced after a certain period of service, even the normal illumination purpose may not be achieved if severe.

SUMMARY OF THE INVENTION

It is an object of the present invention to provide a rotating mechanism of a working lamp, in which the light can be universally adjusted to a required angle and the lamp can be reliable positioned.

For achieving the above stated object, a rotating mechanism, for a working lamp with a housing and a base, connected between the housing and the base, comprising: a connecting column with a first end and a second end; a ball join attached to the first end of the connecting column; a seat, for receiving the ball joint, placed inside the base; and an elastic member placed inside the seat; wherein the second end of the connecting column extends inside the housing; the ball joint is rotatably mounted inside the seat and the elastic member pushes the ball joint against the seat, and the connecting column relative to the housing, or the seat relative to the base, can move along the axis of the housing.

Preferably, the second end of the connecting column is fixed inside the housing, a cavity is defined axially inside the base, and an opening is defined on the top of the base for the connecting column to pass through, the seat can slide inside the cavity. Under such solution, the overall structure may be more stable and rational.

Preferably, a bearing plate with a top surface and a lower surface is provided inside the seat, the top surface of the bearing plate has a ball recess for receiving the ball joint, a plug placed at a bottom end of the seat, the elastic member is a spring pressing against the bottom surface of the bearing plate and the plug. The arrangement of the bearing plate may prevent the spring from direct contact with the ball joint, thereby reducing the wear of the ball joint. Of course, the elastic member mentioned above is not limited to the spring described above. The elastic member may also be a U-shaped elastic sheet transversely placed in the seat, an upper surface of the U-shaped elastic sheet resisting against the ball joint, or, an arched reed with a top raised upward, the top resisting against the ball joint, or directly an elastic plug that is detachably connected (for example, connected by threads, clamped or fixed by screws) within the seat, an upper end surface of the plug resisting against the ball joint. This solution may also achieve the purpose of tightly resisting the ball joint against the seat.

To ensure that the ball joint is always resisted against within the seat reliably when in service, the plug is threaded and screwed inside the seat. In this case, even if there is wear between the ball joint and the seat, the wear loss may be compensated by rotating the plug.

Preferably, the base further comprises an outer base and an inner base removably inserted into the outer base, the cavity is defined inside the inner base, and at least one positioning member for positioning the seat at the top or bottom of the cavity is disposed between the side wall of the inner base and the outer surface of the seat. By using the base of a split structure is convenient for manufacturing. The arrangement of the positioning members may improve the operational feel and also avoid the excessive extension or excessive contraction of the seat.

Preferably, a radial hole is defined on the side wall of the inner base, the at least one positioning member further comprises a positioning pin for inserting into the radial hole and a compression spring engaged to the positioning pin, the compression spring presses against the positioning pin and a pressing plate attached to the side wall of the inner base, the outer surface of the seat further comprises an upper positioning recess and a lower positioning recess for receiving the head of positioning pin. This solution is simple in structure and easy to implement.

Preferably, the edge of the sectioned contact face between the cavity of the inner base and the seat is composed of two arc edges and two straight edges, in order to avoid the rotation of the seat along with the ball joint.

Preferably, an annular groove, for receiving a sealing ring, is formed on the outer surface of the seat. The sealing ring can improve the resistance when the seat moves in the axial direction, thereby avoiding the shut of the housing relative to the base after detached.

In order to be convenient for the positioning of the working lamp, a magnet is placed between the inner base and the bottom of the outer base.

For achieving the above stated object, a rotating mechanism, for a working lamp with a housing and a base, connected between the housing and the base, comprising: a connecting column with a first end and a second end; a ball join attached to the first end of the connecting column; a seat, for receiving the ball joint, placed inside the housing; and an elastic member placed inside the seat; wherein the second end of the connecting column is attached to the seat; the ball joint is rotatably mounted inside the seat and the elastic member pushes the ball joint against the seat, and the connecting column relative to the base, or the seat relative to the housing, can move along the axis of the housing.

In the second technical solution, preferably, the connecting column is fixed on the base. The seat can move along relative to move along the axis of a cavity of the housing. In this case, a bearing plate with a top surface and a lower surface is provided inside the seat, the top surface of the bearing plate has a ball recess for receiving the ball joint, a plug placed at a bottom end of the seat, the elastic member is a spring pressing against the top surface of the bearing plate and the plug.

Similarly, to ensure that the ball joint is always resisted against within the seat reliably when in service, the plug is threaded and screwed inside the seat. In this case, even if there is wear between the ball joint and the seat, the wear loss may be compensated by rotating the plug.

Likewise, an annular groove, for receiving a sealing ring, is formed on the outer surface of the seat. The annular groove can improve the resistance when the seat moves in the axial direction. At least one positioning members for positioning the seat at the top or bottom of the cavity is disposed between the seat and the inner wall of the cavity of the housing.

Compared with the prior art, in the invention, the ball joint is tightly resisted against and rotatably disposed in the seat by the elastic member, thus a certain space may be formed between the ball joint and the seat due to the compression allowance of the elastic member during the rotation, thereby ensuring that the ball joint performs stepless rotation of 360 degrees as required and then drives the housing on the connecting column (or seat) and the illuminant in the housing to rotate, subsequently realizing universal illumination conveniently. After the rotation ends, the ball joint is tightly resisted against the seat with the aid of the restoring force of the elastic member, thereby ensuring that the ball joint and the connecting column are positioned at required angles. Meanwhile, due to the axial movement between the connecting column and the housing (or base), or the relative movement between the seat and the base (or housing), the housing starts to perform the required rotation after being separated a distance from the seat, thereby avoiding interference during the universal rotation between the housing and the base. Therefore, in the invention, light can be universally adjusted to a required angle and the purpose of reliable positioning can be realized, so that the requirements of users are better met.

DETAILED DESCRIPTION OF THE PREFERRED EMBODIMENT

Figure 1:
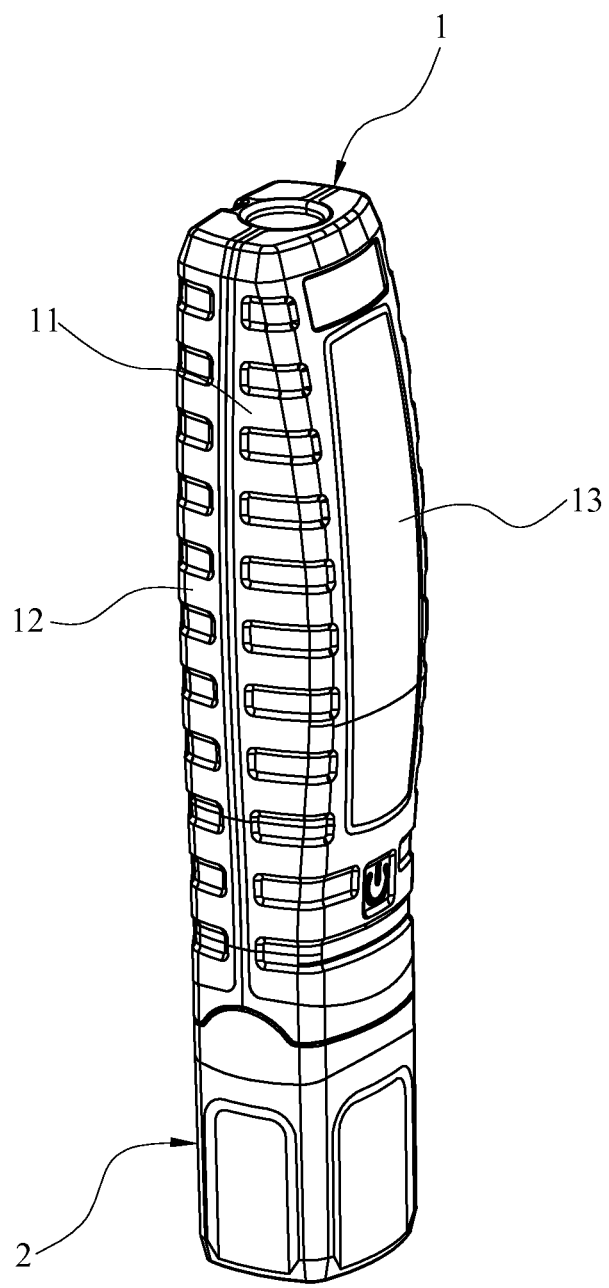
FIG. 1 is a perspective view of a working lamp in accordance with an embodiment of the present invention when a housing and a seat are in a shut state.
Figure 2:
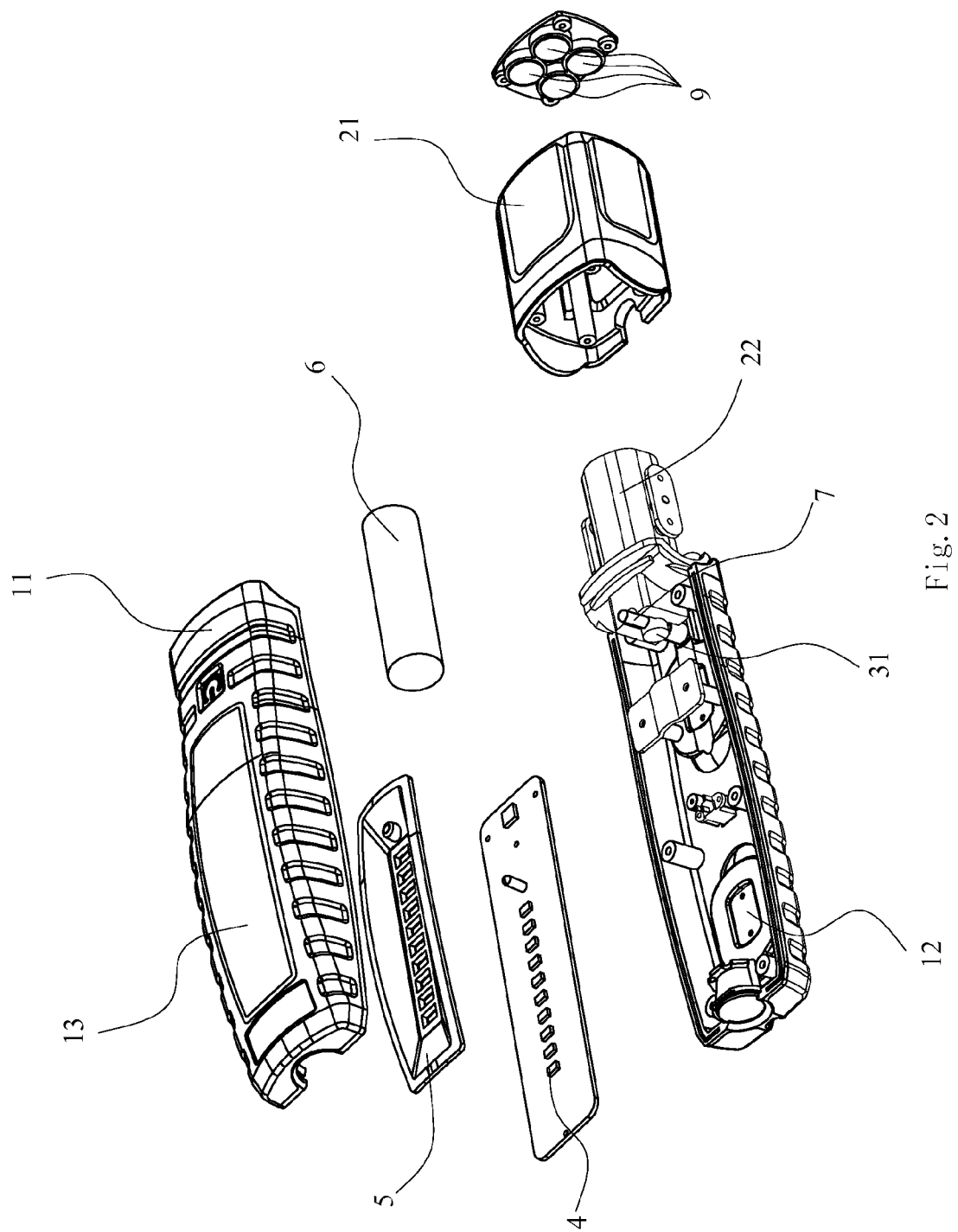
FIG. 2 is a partially exploded view of FIG. 1.
Figure 3:
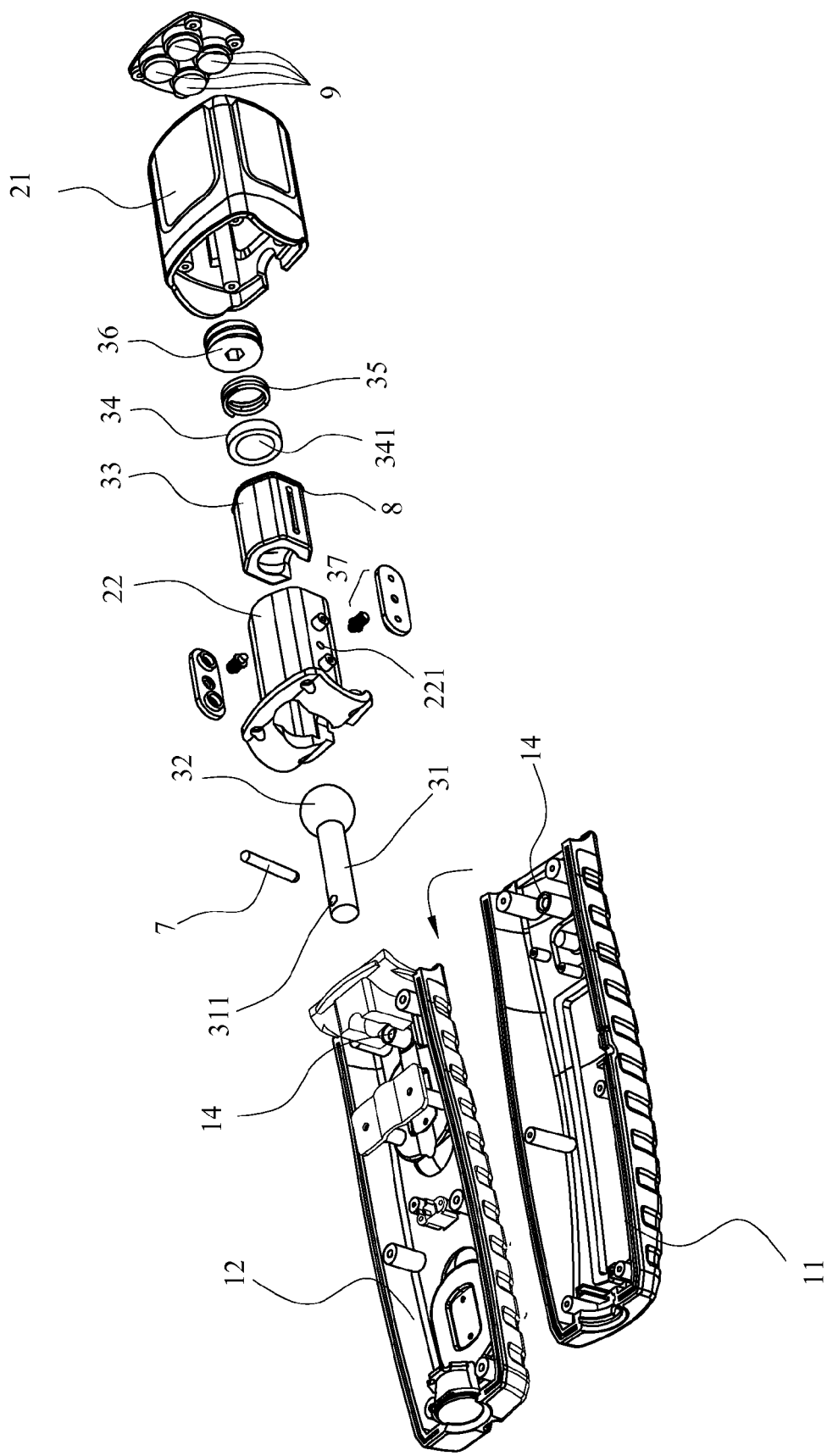
FIG. 3 is an exploded view of FIG. 2 when the reflector, the circuit board and the battery are removed.
Figure 4:
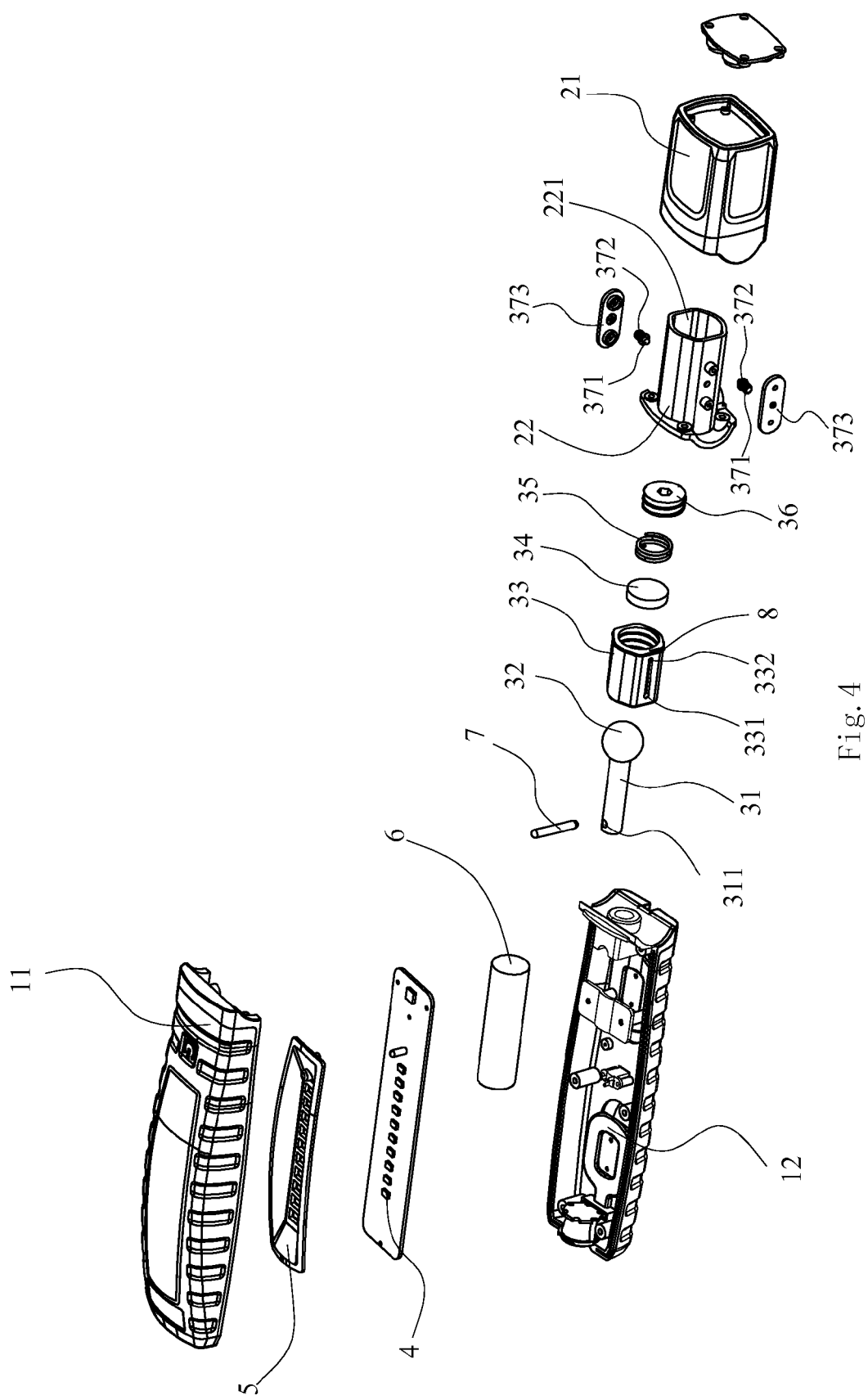
FIG. 4 is another exploded view of FIG. 3 seen from back side.

To enable a further understanding of the innovative and technological content of the invention herein refer to the detailed description of the invention and the accompanying drawings below:

As shown in FIG. 1 to FIG. 7, the working lamp comprises a housing 1, a base 2 and a rotating mechanism 3 connected between the housing and the base, wherein the housing 1 is composed of a front housing 11 and a rear housing 12 buckled with each other and assembled via screws. The front surface of the front housing is provided with a transparent body 13. An illuminant 4, a reflector 5 and batteries 6 are mounted in the housing. Light emitted by the illuminant 4 irradiates out from the transparent body 13. The base 2 is located below the housing 1. The housing 1 and the base 2 may be separated or shut relatively via the rotating mechanism 3. In the separated state, the housing 1 and the base 2 may perform relatively universal rotation via the rotating mechanism 3, to realize adjustment on the angle of light as required.

The rotating mechanism 3 is composed of a connecting column 31 with a first end and a second end and a ball join 32 attached to the first end of the connecting column 31. In this embodiment, the second end of the connecting column 31 extends inside the housing 1 and is formed with a pin hole 311 for receiving a pin 7. Furthermore, two ends of the pin 7 are supported within installation holes 14 on the front and rear housings, so that the second end of the connecting column 31 is fixedly connected inside the housing 1, referring to FIG. 2 and FIG. 3. The ball joint 32 is rotatably mounted inside the seat 33. A bearing plate 34, an elastic member 35 and a plug 36 are also provided in the seat 33. The top surface of the bearing plate 34 has a ball recess 341 for receiving the ball joint 32. The elastic member 35 is a spring located between the bearing plate 34 and the plug 36, i.e., two ends of the spring respectively presses against the bottom surface of the bearing plate 34 and the plug 36, so that the elastic member 35 pushes the ball joint 32 against the seat 33. To keep the ball joint always in the best tightly-pressed state during in service, the plug 36 is threaded and screwed inside the seat 33. In this case, when the wear loss between the ball joint 32 and the seat 33 increases after a long period of use of the working lamp, the acting force of the spring may be adjusted conveniently by rotating the plug 36, so that the ball joint is always tightly pushed against the seat by the elastic member, thereby effectively ensuring that the housing is positioned at a required angle after rotation.

In this embodiment, the connecting column 31 is immovable relative to the housing 1, thus the seat 33 is designed to be of a structure capable of axially movement relative to the base 2. In this case, a cavity 221 is defined axially inside the base 2, and an opening a is defined on the top of the base 2 for the connecting column 31 to pass through, and a side wall of the opening of the through hole is provided with a gap b in order to increase the range of rotation angle. Here, the base 2 comprises an outer base 21 and an inner base 22. The inner base 22 is located in the outer base 21 and fixed via four screws on the top portion, so that the inner base 22 can be removably inserted into the outer base 21. The cavity 221 is defined inside the inner base 22. The through hole a and the gap b are located at corresponding portions of the inner base and the outer base after assembled. Meanwhile, at least one positioning member 37 for positioning the seat 33 at the top or bottom of the cavity 221 is disposed between the side wall of the inner base 22 and the outer surface of the seat 33. The at least one positioning member 37 may improve the operational feel and avoid excessive extension or contraction of the seat, thereby prolonging the service life of the working lamp.

Figure 5:
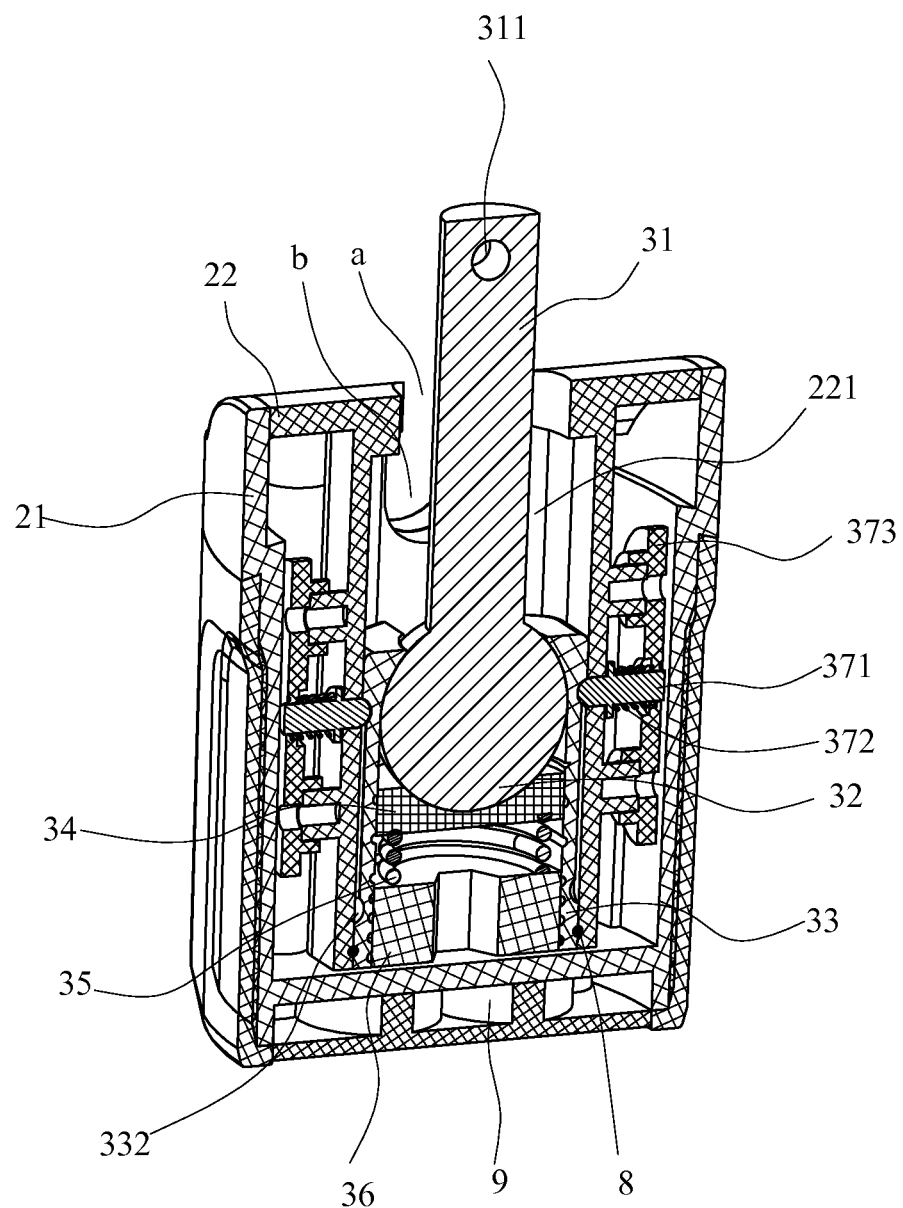
FIG. 5 is a sectional view of FIG. 1, when the housing and components inside the housing are removed.
Figure 6:
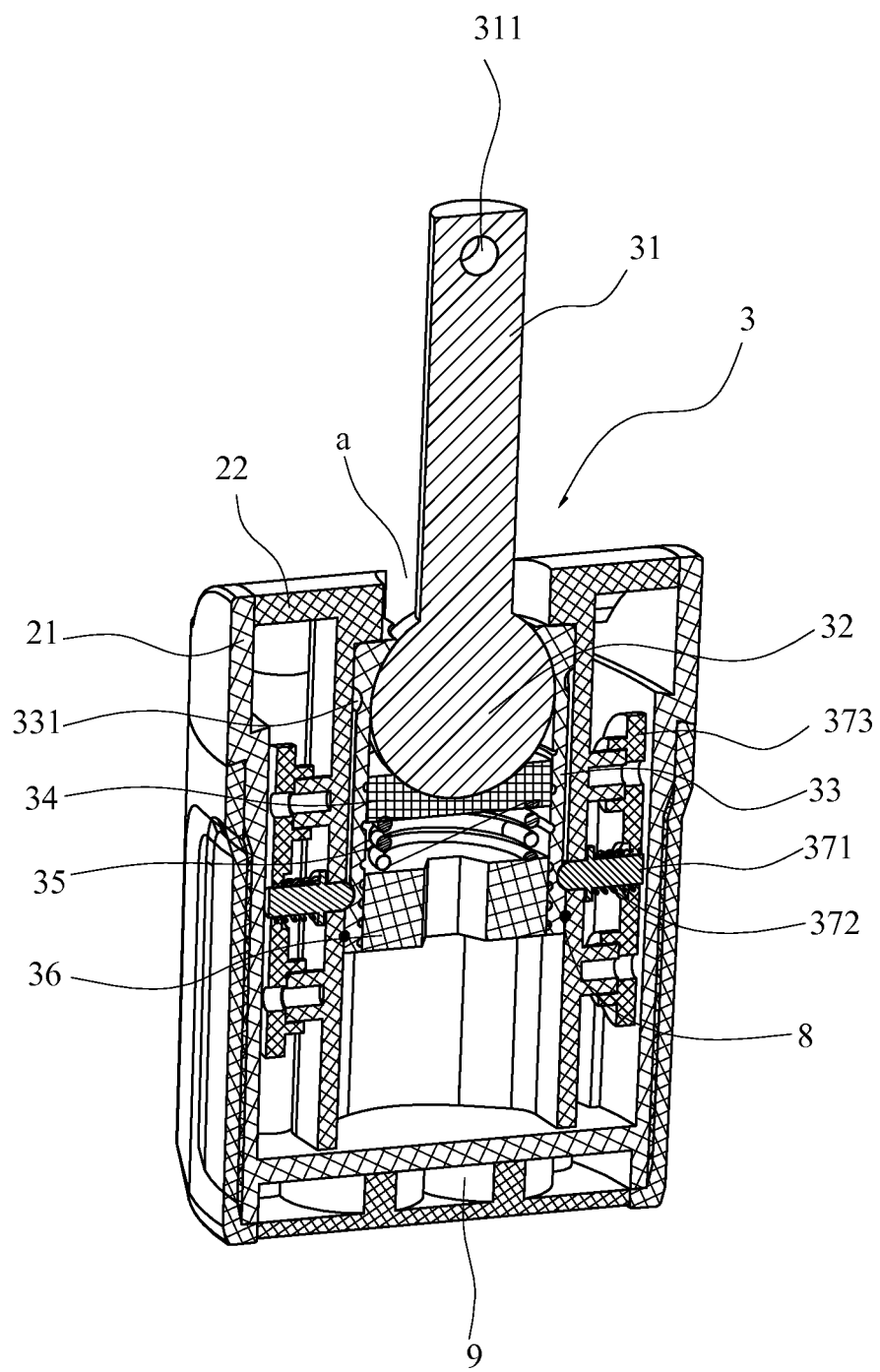
FIG. 6 is a perspective view of FIG. 5 when the seat, the ball joint and the connecting column all move upward to the top of the cavity.

The at least one positioning member may have various structures. In this embodiment, the following structure is preferably employed. A radial hole 223 is defined on the side wall of the inner base 22, the at least one positioning member 37 further comprises a positioning pin 371 for inserting into the radial hole 223 and a compression spring 372 engaged to the positioning pin 371. The compression spring 372 presses against a flange on the positioning pin 371 and a pressing plate 373 attached to the side wall of the inner base 22 via two screws. Correspondingly, the outer surface of the seat 33 further comprises an upper positioning recess 331 and a lower positioning recess 332 for receiving the head of positioning pin 371. When the seat is located at the bottom of the cavity, as shown in FIG. 5, the head of the positioning pin is inserted into the upper positioning groove 331 under the restoring force of the compression spring; and when the seat is located at the top of the cavity, as shown in FIG. 6, similarly, the head of the positioning pin is inserted into the lower positioning groove 332 under the restoring force of the compression spring, so that the reliable positioning is realized.

Figure 7:
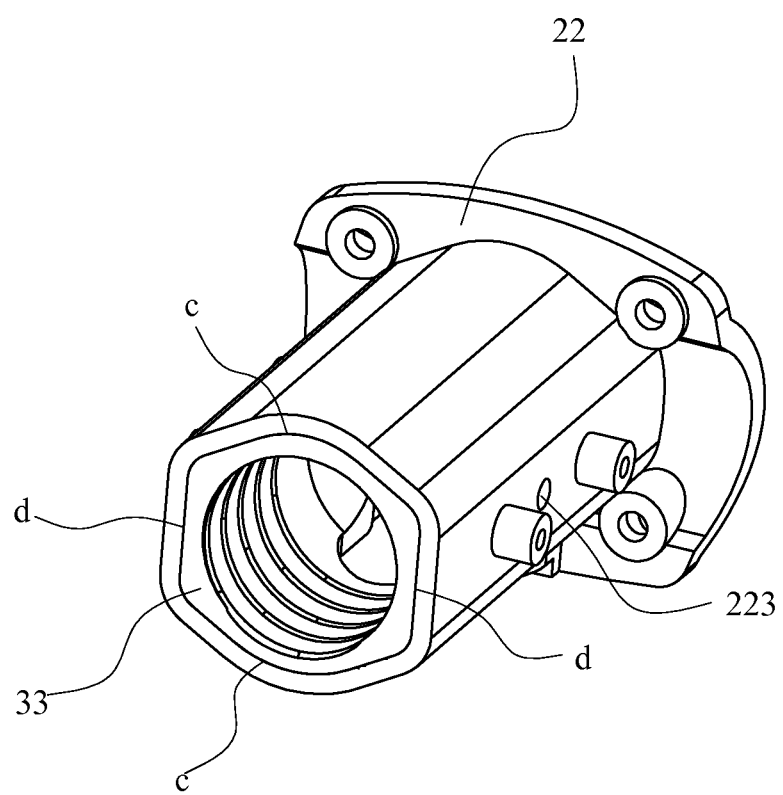
FIG. 7 is a perspective view of the seat in the inner base in accordance with the embodiment of the present invention.

In this embodiment, in order to avoid the rotation of the seat while the ball joint is rotating within the seat, the edge of the sectioned contact face between the cavity 221 of the inner base 22 and the seat 33 is composed of two arc edges c and two straight edges d, referring to FIG. 7. Such a structure may not only ensure the axial movement of the seat 33 within the cavity, but also avoid the rotation of the seat 33 within the cavity, and further protect a sealing ring 8 mentioned below from early wear to prolong the service life of the sealing ring.

In order to enhance the resistance of the seat during the axial movement within the cavity, an annular groove, for receiving a sealing ring 8, is formed on the outer surface of the seat 33.

In this embodiment, in order to fix the working lamp onto an irony platform conveniently, a magnet 9 is placed between the inner base 22 and the bottom of the outer base 21. In addition, in order to hang the working lamp up, two hooks 10 are provided on the back of the housing of the working lamp. Furthermore, the hooks may be hidden at the back side of the housing after being rotated, so that the overall appearance of the working lamp cannot be influenced.

Figure 8:
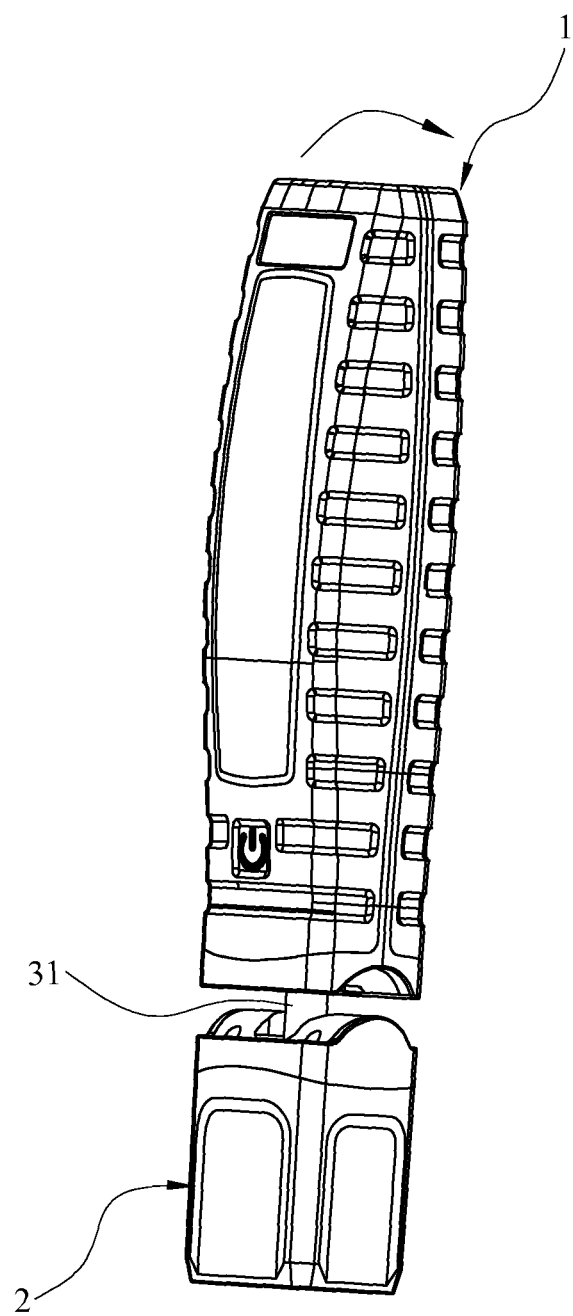
FIG. 8 is a perspective view of the working lamp when it is in the state shown in FIG. 6.
Figure 9:
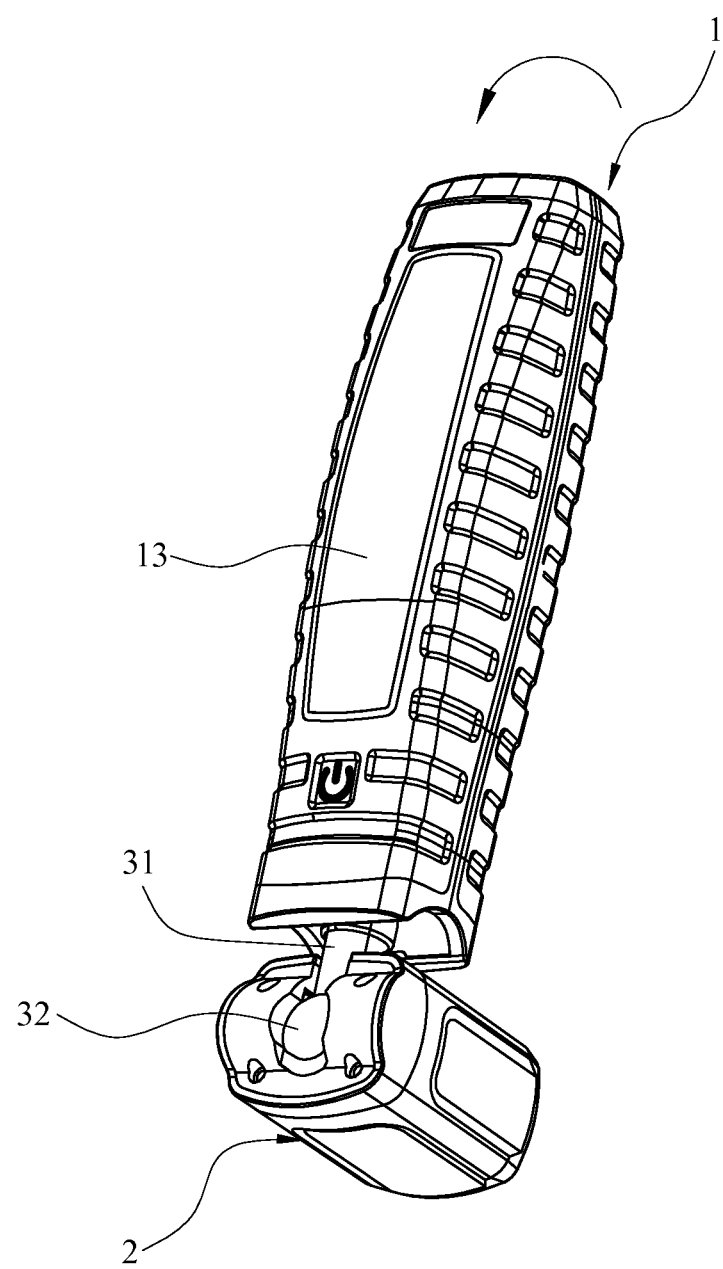
FIG. 9 is a perspective view of the working lamp in the state shown in FIG. 8, after the housing rotates an angle with respect to a base according to the direction of an arrow in FIG. 8.
Figure 10:
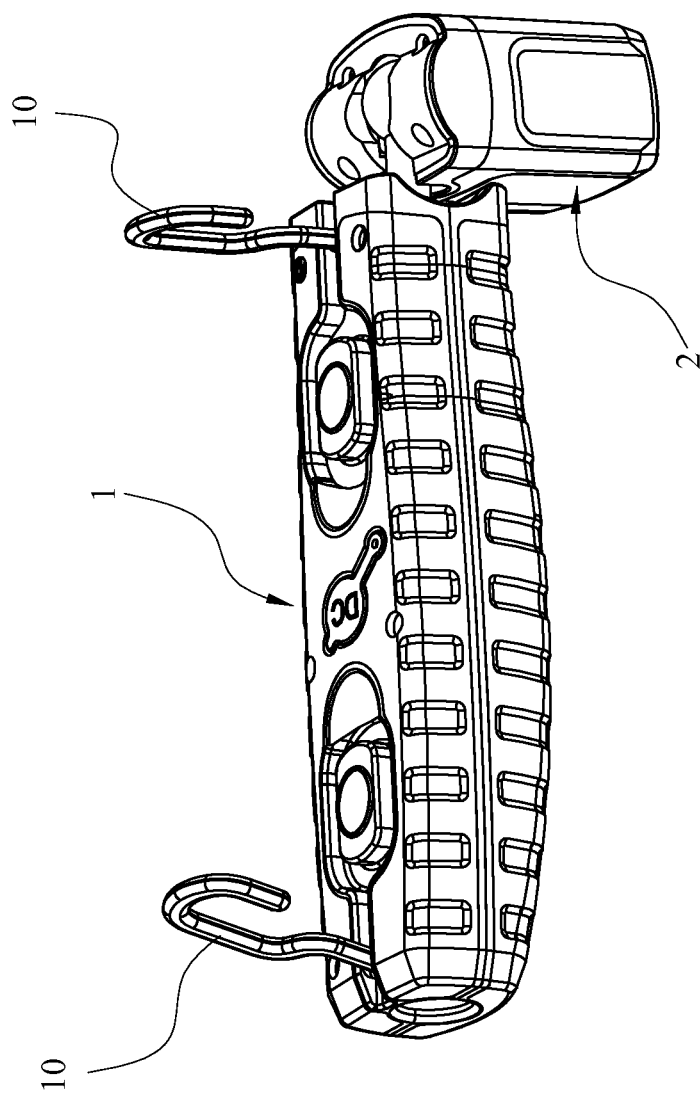
FIG. 10 is a perspective view of the working lamp in the state shown in FIG. 9, after the housing rotates an angle with respect to a base according to the direction of an arrow in FIG. 9.
Figure 11:
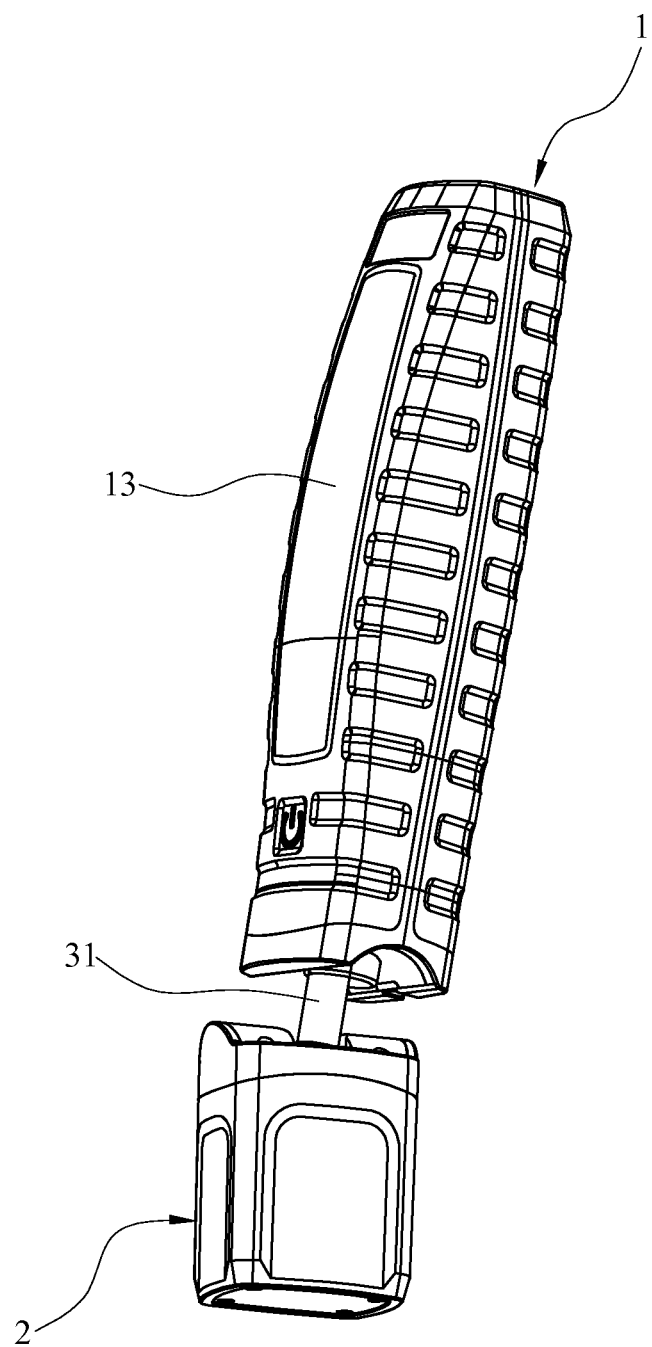
FIG. 11 is a perspective view of the working lamp in the state shown in FIG. 8, after rotating an angle clockwise.

When in service, as long as the housing is pulled, the seat is driven to move upward within the cavity by the connecting column and the ball joint, so that the housing and the base are separated from each other, referring to FIG. 8. Then, the housing is rotated as required, referring to FIG. 9 to FIG. 11, so that the housing is rotated to a required angle to meet the requirement of illumination.

Although the preferred embodiments of the invention have been described as above in details, those skilled in the art could clearly understand that the invention may have various modifications and variations. For example, the seat may be immovable relative to the base, and the second end of the connecting column may move long the axis of the housing; or, the seat is placed in the housing and axially moves relative to the housing, and the second end of the connecting column is fixed on the base; or, the seat is placed in the housing to be immovable, and the second end of the connecting column may move relative to the base. When the connecting column moves relative to the housing or base, the connecting column may be fixed with a sliding block with a structure similar to that of the seat. A sealing ring may also be provided on the sliding block. All these solutions mentioned above may realize the requirement that the housing performs relatively universal rotation after the housing is separated relative to the base. Therefore, all modifications, equivalent replacements, improvements, etc. within the sprit and principle of the invention should fall into the protection scope of the invention.

The invention claimed is:

1. A rotating mechanism, for a working lamp with a housing and a base, connected between the housing and the base, comprising:
   a connecting column with a first end and a second end;
   a ball joint attached to the first end of the connecting column;
   a seat, for receiving the ball joint, placed inside the base; and an elastic member placed inside the seat;
wherein
the second end of the connecting column extends inside the housing;
the ball joint is rotatably mounted inside the seat and the elastic member pushes the ball joint against the seat, and
the connecting column relative to the housing, or the seat relative to the base, can move along the axis of the housing,
wherein the housing has a bottom face with a concave surface defining a hole for receiving the connecting column,
the base has a top face with two separate convex surfaces, the connecting column passing between the two separate convex surfaces, and
the concave surface matching the two convex surfaces.

2. The rotating mechanism of claim 1, wherein the second end of the connecting column is fixed inside the housing, a cavity is defined axially inside the base, and an opening is defined on the top face of the base for the connecting column to pass through, the seat can slide inside the cavity.

3. The rotating mechanism of claim 1, wherein a bearing plate with a top surface and a lower surface is provided inside the seat, the top surface of the bearing plate has a ball recess for receiving the ball joint, a plug placed at a bottom end of the seat, the elastic member is a spring pressing against the bottom surface of the bearing plate and the plug.

4. The rotating mechanism of claim 3, wherein the plug is threaded and screwed inside the seat.

5. The rotating mechanism of claim 1, wherein the base further comprises an outer base and an inner base removably inserted into the outer base, a cavity is defined inside the inner base, and at least one positioning member for positioning the seat at the top or bottom of the cavity is disposed between a side wall of the inner base and an outer surface of the seat.

6. The rotating mechanism of claim 5, wherein a radial hole is defined on the side wall of the inner base, the at least one positioning member further comprises a positioning pin for inserting into the radial hole and a compression spring engaged to the positioning pin, the compression spring presses against the positioning pin and a pressing plate attached to the side wall of the inner base, the outer surface of the seat further comprises an upper positioning recess and a lower positioning recess for receiving the head of positioning pin.

7. The rotating mechanism of claim 5, wherein the edge of the sectioned contact face between the cavity of the inner base and the seat is composed of two arc edges and two straight edges.

8. The rotating mechanism of claim 5, wherein an annular groove, for receiving a sealing ring, is formed on the outer surface of the seat.

9. The rotating mechanism of claim 5, wherein a magnet is placed between the inner base and the bottom of the outer base.

10. A rotating mechanism, for a working lamp with a housing and a base, connected between the housing and the base, comprising:
a connecting column with a first end and a second end;
a ball joint attached to the first end of the connecting column;
a seat, for receiving the ball joint, placed inside the housing; and
an elastic member placed inside the seat;
wherein
the second end of the connecting column is attached to the seat;
the ball joint is rotatably mounted inside the seat and the elastic member pushes the ball joint against the seat, and
the connecting column relative to the base, or the seat relative to the housing, can move along an axis of the housing,
wherein the housing has a bottom face with a concave surface defining a hole for receiving the connecting column,
the base has a top face with two separate convex surfaces, the connecting column passing between the two separate convex surfaces, and
the concave surface matching the two convex surfaces.

* * * * *